United States Patent
Meyers et al.

(10) Patent No.: US 7,905,595 B2
(45) Date of Patent: Mar. 15, 2011

(54) SYSTEM AND METHOD TO TREAT AND PREVENT LOSS OF VISUAL ACUITY

(75) Inventors: William E. Meyers, Scottsdale, AZ (US); Hemann Neidlinger, San Jose, CA (US)

(73) Assignee: CRT Technology, Inc., Mesa, AZ (US)

( * ) Notice: Subject to any disclaimer, the term of this patent is extended or adjusted under 35 U.S.C. 154(b) by 9 days.

(21) Appl. No.: 12/110,999

(22) Filed: Apr. 28, 2008

(65) Prior Publication Data
US 2009/0268154 A1    Oct. 29, 2009

(51) Int. Cl.
G02C 7/04    (2006.01)
G02C 7/02    (2006.01)

(52) U.S. Cl. ............... 351/168; 351/160 R; 351/161; 351/177

(58) Field of Classification Search .......... 351/159, 351/160 R, 163, 205, 221, 200, 246, 247, 351/176, 177; 428/1.31; 264/1.31, 1.32; 252/585

See application file for complete search history.

(56) References Cited

U.S. PATENT DOCUMENTS

| | | | | |
|---|---|---|---|---|
| 1,918,848 A | * | 7/1933 | Land et al. | 359/492 |
| 1,963,496 A | * | 6/1934 | Land | 359/296 |
| 2,005,426 A | * | 6/1935 | Land | 351/49 |
| 2,123,901 A | * | 7/1938 | Land | 359/500 |
| 5,073,021 A | * | 12/1991 | Marron | 351/168 |
| 5,142,411 A | | 8/1992 | Fiala | |
| 5,410,375 A | * | 4/1995 | Fiala | 351/168 |
| 5,629,055 A | * | 5/1997 | Revol et al. | 428/1.31 |
| 5,963,297 A | * | 10/1999 | Reim | 351/160 R |
| 7,025,460 B2 | | 4/2006 | Smitth et al. | |
| 2004/0223116 A1 | * | 11/2004 | Baugh | 351/160 R |
| 2004/0232394 A1 | * | 11/2004 | Khan et al. | 252/585 |
| 2006/0203189 A1 | | 9/2006 | Ho et al. | |
| 2007/0296916 A1 | | 12/2007 | Holden et al. | |

OTHER PUBLICATIONS

Hecht, Eugene. Optics. Reading, MA: Addison-Wesley, 1998. pp. 360-361. Print.*
Fowles, Grant R. Introduction to Modern Optics. New York: Dover Publications, 1989. p. 180-183. Print.*
International Search Report and Written Opinion for International Application No. PCT/US2009/041069 dated Jun. 8, 2009.
International Preliminary Report on Patentability for International Application No. PCT/US09/41069 dated Jul. 15, 2010.

* cited by examiner

*Primary Examiner* — Ricky L Mack
*Assistant Examiner* — Zachary Wilkes
(74) *Attorney, Agent, or Firm* — Snell & Wilmer LLP

(57) ABSTRACT

A system and method for treating and preventing loss of visual acuity. The system comprises a vision correcting lens, such as a contact lens, having a material with a regular pattern of orientation of polarizable molecular bonds, so as to create a birefringent effect. Off-axis light rays are refracted through the contact lens so as to focus in front of the retina, whereas on-axis light rays pass through the contact lens without refraction, such that their focal point on the fovea is unaltered. In an exemplary embodiment, a contact lens of the present invention is capable of independently altering the refractive state of the eye in relation to fovea and peripheral retina so as to simultaneously correcting visual acuity while minimizing the signal for axial growth and hence myopic progression.

17 Claims, 14 Drawing Sheets

SYSTEM AND METHOD TO TREAT AND PREVENT LOSS OF VISUAL ACUITY

FIELD OF THE INVENTION

This invention relates to systems and methods for treating and preventing the loss of visual acuity. More specifically, this invention relates to systems and methods for adjusting the focal point of light rays entering the eye to treat and prevent myopia.

BACKGROUND OF THE INVENTION

Myopia, otherwise known as nearsightedness, is a common ailment. Myopia is a refractive defect of the eye in which images are focused within the vitreous inside of the eye rather than on the retina at the back of the eye, causing near object to appear in sharp resolution, but distant objects to appear blurred. A myopic condition is illustrated in FIG. 1. As shown, on-axis light rays 9 (light rays entering the eye 1 parallel to the central axis 7 of eye 1), and off-axis light rays 11 (light rays entering the eye at an angle of incidence relative to central axis 7 and refracted by the cornea 5 and crystalline lens 3 into eye 1), forming field of focus 13. In a myopic patient, field of focus 13 of axial light entering the eye is located in front of (anterior to) retina 15, causing decreased visual acuity. The curvature of the field of focus is in part determined by the curvature of anterior and posterior surfaces of the cornea, and thus varies from patient to patient.

Conventional myopia treatment techniques adjust the focal point of on-axis light rays by changing the refractive state of the cornea. As illustrated in FIG. 2, these techniques shift field of focus 13 back toward the retina 15, such that on-axis light rays 9 focus on fovea 16 located in the center of the retina 15. Conventional myopia treatment techniques include, for example, aspheric or multi-radial geometry contact lenses, glasses, corneal implants, orthokeratology (use of contact lenses to flatten the curvature of the anterior cornea), and various refractive surgical procedures, such as LASIK, PRK, and LASEK.

However, there are disadvantages associated with such conventional techniques. For example, with continued reference to FIG. 2, if the curvature of the field of focus 13 is flatter than the curvature of retina 15, a portion of the field of focus 13 is moved behind (posterior to) peripheral retina 17 when foveal myopia is treated, causing diminished image resolution in the retinal periphery. The eye responds to peripheral defocus by elongating the eye to cause the focal point of off-axis light rays to focus on or in front of the peripheral retina. Although the response of peripheral retina 17 achieves the desired effect of moving the focal point of the off-axis light in front of peripheral retina 17, it simultaneously causes the focal point of on-axis light rays to focus off fovea 16, thereby decreasing visual acuity. Moreover, correcting this defocus can initiate another round of peripheral defocus and eye elongation.

Specifically, research in the field of optics has recently established that poor image quality in the retinal periphery, in addition to the fovea, can play a major role in the development of myopia. When the peripheral retina does not sense clear focus (particularly when the field of focus is behind the retina), over time, the eye axially elongates in order to focus the off-axis light rays on or in front of the retina. In this regard, defocus at the peripheral retina has been demonstrated to be primarily responsible for the signal for axial length increase. The elongation of the eye increases the distance from the cornea to the retina, causing more of the on-axis rays to focus on or in front of the fovea. This effect is discussed, for example, in U.S. Pat. No. 7,025,460, Smith et al, entitled "Methods and Apparatuses for Altering Relative Curvature of Field and Positions of Peripheral, Off-Axis Focal Positions" ("Smith").

An undesirable side effect of axial elongation is the focal point of on-axis light is moved off of the fovea, causing the previously-treated foveal myopia to reoccur. In other words, conventional techniques of treating foveal myopia can actually contribute to the progression of myopia in a patient over time.

In order to prevent axial elongation, the signal provided to the peripheral retina to stimulate growth must be minimized and/or eliminated by focusing off-axis light rays on or in front of the retina. To achieve this objective, Smith discloses optical, surgical and therapeutic systems and methods of altering the shape of the focal plane to keep the peripheral focal plane on or in front of the retina concomitant with methods of improving the focus of on-axis rays at the fovea. However, a disadvantage of the systems disclosed in Smith is that these methods alter the focal point of non-central on-axis light, such that it does not focus on the fovea. Since primary vision is dependent on light focusing on the fovea for precise acuity, it is undesirable to alter the focal point of non-central off axis away from the fovea.

As such, what is needed is a system and method capable of causing off-axis light rays to focus on or in front of the peripheral retina, without affecting the focal point of non-central on-axis rays.

SUMMARY OF THE INVENTION

While the way that the present invention overcomes the disadvantages of the known art will be discussed in greater detail below, in general, the present invention prevents loss of visual acuity by steepening the field of focus of light entering the eye.

In accordance with various exemplary embodiments of the present invention, a system of myopia control is provided. A system of myopia control is any system or device which causes off-axis light rays to focus on or in front of the peripheral retina without substantially altering the focal point of on-axis light rays, thereby minimizing and/or preventing the progression of myopia.

In an exemplary embodiment, the present invention comprises a vision correcting lens, such as a contact lens, formed of a birefringent material having polarizable bonds oriented parallel or substantially parallel to the central axis of the eye. Suitable materials include, but are not limited to, copolymers containing poly(ethylene terephthalates), poly(carbonates), poly(sulfones), poly(ethersulfones), poly(styrenes), poly(estercarbonates), rigid rod poly(amides), and polymers in which donor and acceptor substituents induce large molecular dipole moments and increased polarizability anisotropy.

In an exemplary embodiment, a vision correcting lens in accordance with the present invention may comprise a homogeneous material of oriented polarizable bonds to achieve a birefringent effect. Moreover, oriented bonds in the contact lens material may be any number suitable to achieve a desired amount of birefringence, thereby enhancing visual acuity.

An exemplary method of the present invention is any method of providing a device or system capable of causing off-axis light rays to focus in front of the peripheral retina without substantially altering the focal point of on-axis light rays.

A method may comprise the steps of providing a contact lens having a birefringent material with a bond-orientation configured to focus off-axis light rays interiorly within the eye relative to the retina. A contact lens may comprise a bond-orientation parallel or substantially parallel to the central axis of an eye.

Another exemplary method includes the steps of determining that all or a portion of the field of focus of off-axis light rays entering the eye is behind the retina and providing a lens having birefringent properties configured to cause all or a portion of off-axis light rays to focus in anterior to the retina.

BRIEF DESCRIPTION OF THE DRAWINGS

The foregoing and further and more specific objects and advantages of the instant invention will become readily apparent to those skilled in the art from the following detailed description of a preferred embodiment thereof taken in conjunction with the drawings, in which.

DETAILED DESCRIPTION

The description that follows is not intended to limit the scope, applicability, or configuration of the invention in any way; rather, it is intended to provide a convenient illustration for implementing various embodiments of the invention. As will become apparent, various changes may be made in the function and arrangement of the elements and composition of the materials described in these embodiments without departing from the scope of the invention. Thus, the detailed description herein is presented for the purpose of illustration only and not of limitation.

That being said, a system of myopia control is provided. A system of myopia control comprises any device or apparatus configured to cause all or a portion of off-axis light rays entering the eye to focus on or in front of the peripheral retina, and on-axis light rays entering the eye to focus on the fovea.

In an exemplary embodiment, the present invention is a device or system which steepens the angle of refraction of all or a portion of off-axis light entering the eye such that the off-axis light rays focus on or in the anterior portion of the retina. For example, a device or system of the present invention may be configured to produce a birefringent effect on off-axis light entering the eye without affecting the focal point of on-axis light rays. In such an embodiment, the on-axis light rays are not refracted by the birefringent character of the lens but may be refracted as needed based on its geometry and non-birefringent index of refraction.

Birefringence is the decomposition of transmitted light into two rays, creating two focal points, otherwise known as double refraction. Birefringent effect is a manifestation of anisotropy in the retardation of light in a refracting medium that occurs as a result of molecular organization in a media having a regular pattern of orientation of polarizable molecular bonds. As light propagates through a material having a organized pattern of molecular bonds, light rays oriented parallel to the molecular bonds are retarded differently than light rays oriented in other directions, which creates two focal points, each having approximately one-half the intensity of the incoming light.

Birefringence has been used in field of optics to create a bifocal effect. For example, U.S. Pat. No. 5,142,411, Fiala, entitled "Multifocal Birefringent Lens System" ("Fiala"), discloses a lens system comprising a large, monofocal lens portion and small, birefringent lens portion to create a "bifocal" effect (Col. 22, Ins 1-10). According to Fiala, this configuration produces vertically polarized light in the monofocal lens portion to enable distance vision, and horizontally polarized light in the birefringent lens portion for near vision. (Col. 22, Ins 40-45). This configuration allows the user to select between the two images, (one near focus, one far focus).

Figure 3:
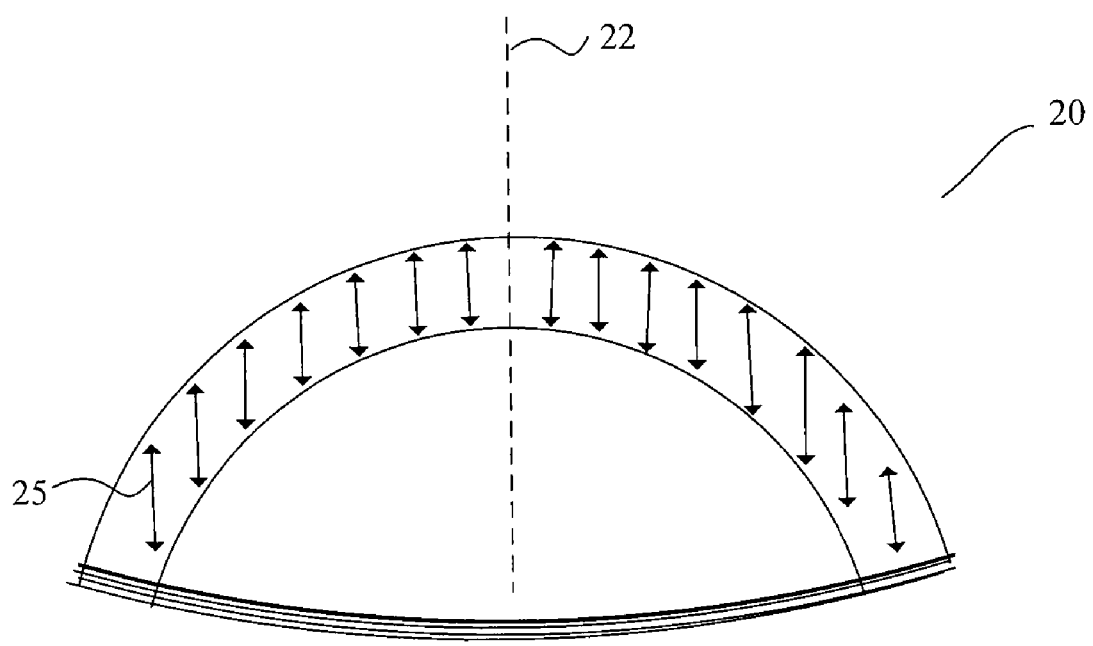
FIG. 3 illustrates a birefringent contact lens of the present invention.
Figure 4:
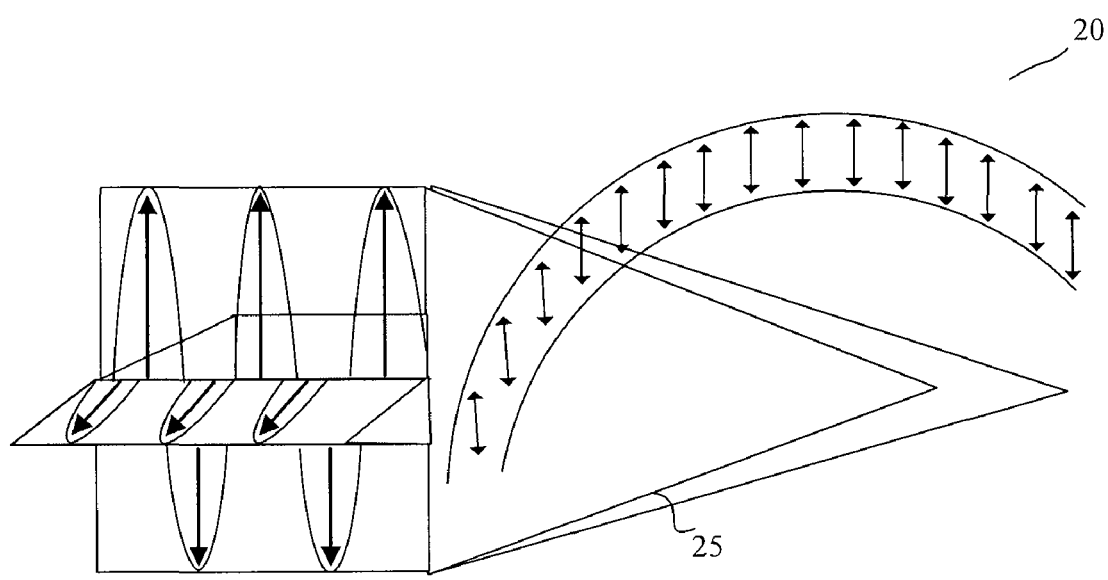
FIG. 4 depicts a birefringent contact lens of the present invention in which off-axis light rays have two focal points.

In an exemplary embodiment, the present invention comprises a contact lens, spectacles (i.e., eye glasses), or other vision correcting device having polarizable bonds oriented parallel or substantially parallel to the central axis of the eye to create a birefringent effect on off-axis light rays. For example, FIG. 3 illustrates a contact lens 20 comprising a refracting media having polarizable bonds 25 that are substantially parallel to central axis 22. As shown in FIG. 4, this bond orientation causes approximately one-half of off-axis light rays 25 (the light rays propagating parallel to the polarizable bonds), to be retarded more than the other half of off-axis light rays 25 (the light rays propagating orthogonal to the polarizable bonds), creating two focal points. This birefringent effect will be observed at all angles of incidence relative to the central axis of the lens.

Figure 1:
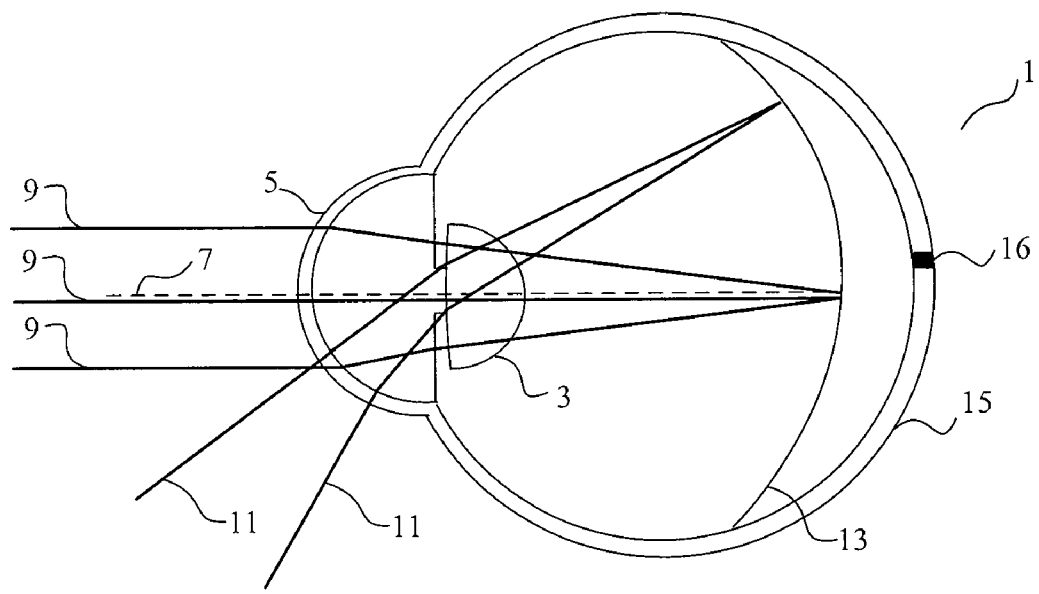
FIG. 1 illustrates off-axis and on-axis light rays entering the eye and a field of focus in front of the retina causing myopia.
Figure 2:
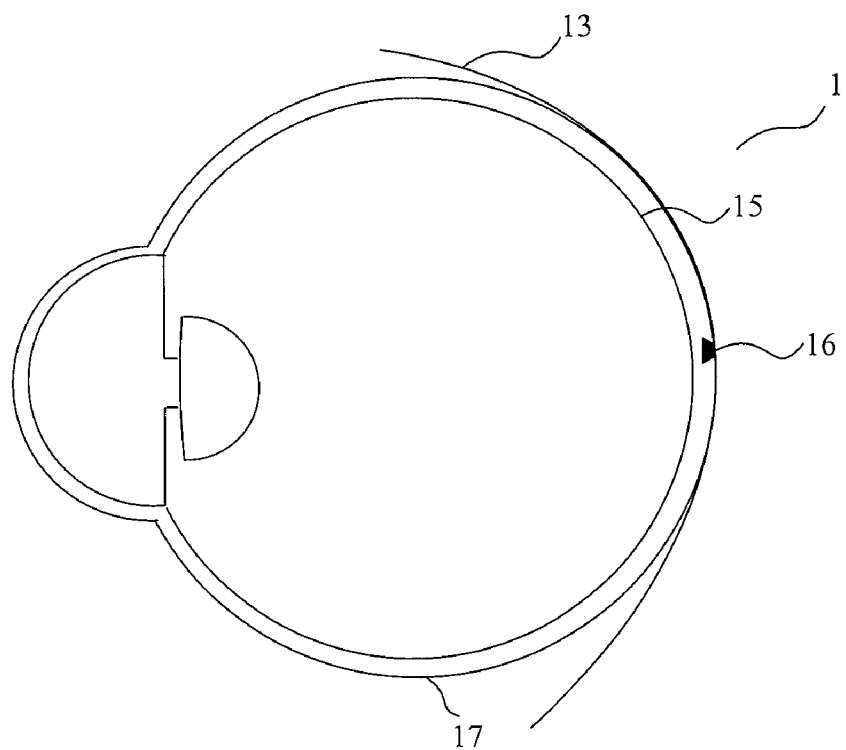
FIG. 2 depicts a field of focus behind the peripheral retina.
Figure 5:
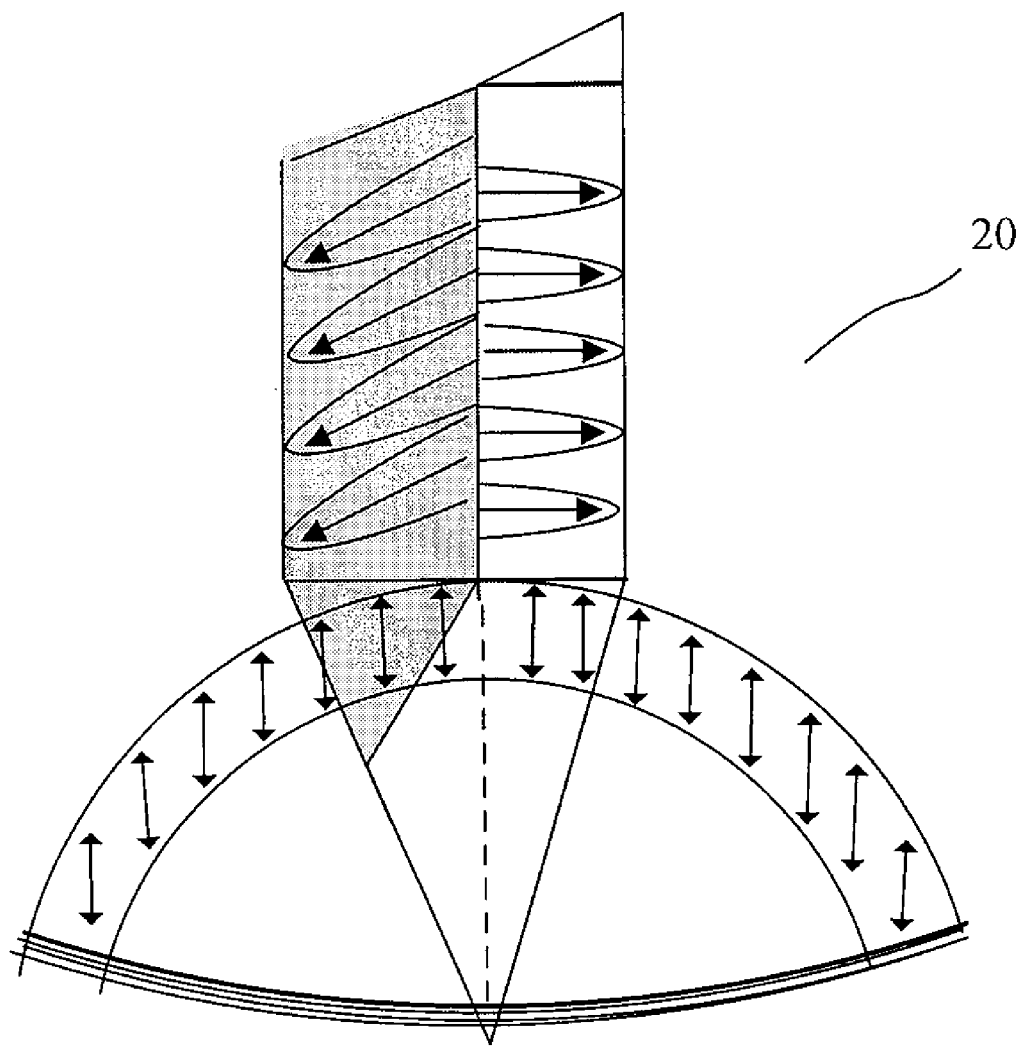
FIG. 5 depicts a contact lens of the present invention in which on-axis light rays pass through the lens unaltered.
Figure 6:
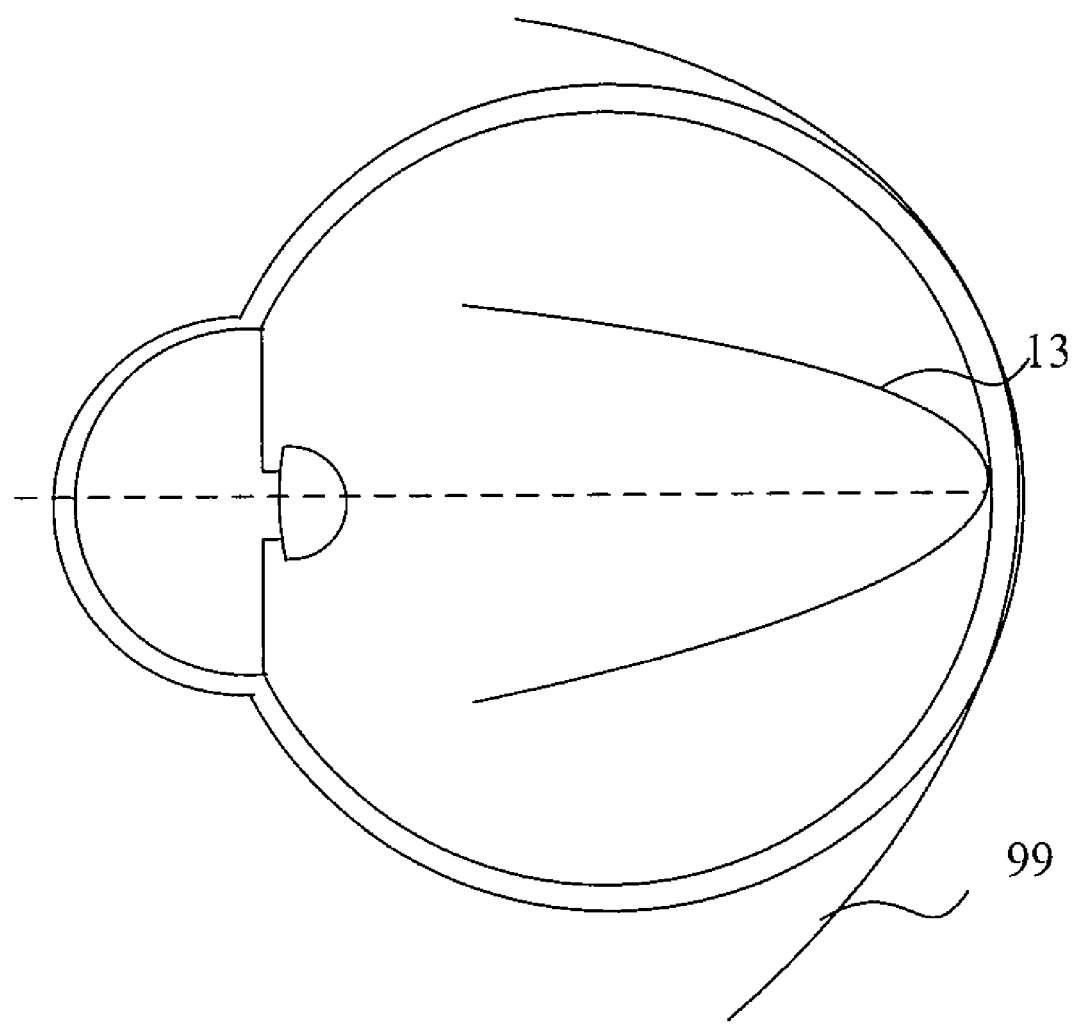
FIG. 6 depicts the two fields of focus induced by a birefringent lens.

In this exemplary embodiment, on-axis light rays will pass through the lens unaltered. As shown in FIG. 5, on-axis light rays propagating through contact lens 20 will not be retarded, as they do not have an electrical field vector oriented parallel to the polarizable bonds in the lens. FIG. 6 depicts fields of focus 13 and 99 produced by a birefringent contact lens having a bond-orientation substantially parallel to the central axis of the lens (correcting a flattened field of focus shown in FIG. 2, in which all peripheral rays are focused behind the retina as a result of non-birefringent correction procedures). As shown, a birefringent lens refracts approximately one half of off-axis light rays into a first field of focus 13 having a steepened curvature, and approximately one-half of the off-axis light rays into a second field of focus 99 behind the retina.

Figure 7:
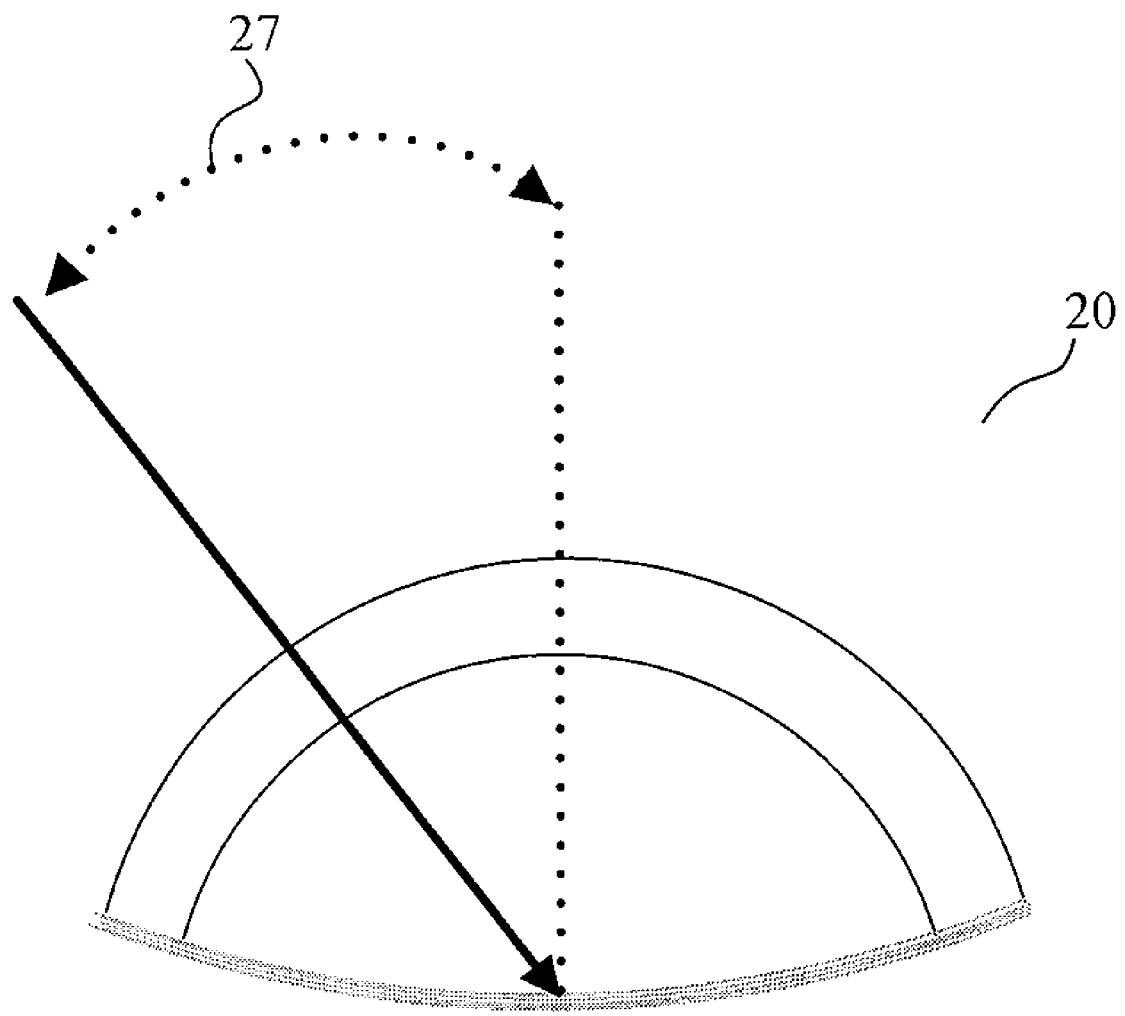
FIG. 7 illustrates off-axis light rays entering the eye at an angle of incidence.

As shown in FIG. 7, the degree to which off-axis light is retarded depends upon the angle of incidence 27 relative to the central axis of off-axis light 11 contacting the lens 20. The greater the angle of incidence, the more interiorly the light will be focused.

Figure 8:
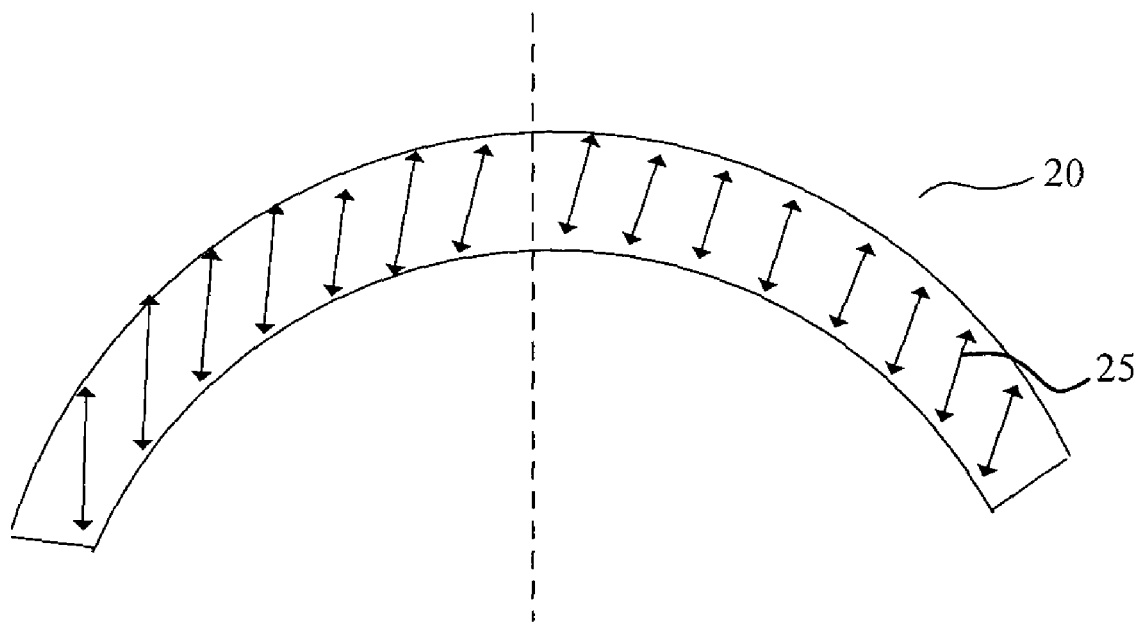
FIG. 8 depicts a contact lens of the present invention having polarizable bonds oriented at 30 degrees relative to the central axis.

In an exemplary embodiment, a contact lens of the present invention may comprise a refracting media having polarizable bonds oriented at any angle of incidence between 0 and 90 degrees relative to the central axis such that the focal points of off-axis and on-axis light rays are adjusted more interiorly to the retina to create the desired field of focus. For example, the embodiment of FIG. 8 depicts contact lens 20 having polarizable bonds 25 oriented at 30 degrees relative to the central axis. Since non-axial orientation will begin to have some effect on on-axis rays a slight bifocal effect may arise. Although a large bifocal effect may be undesirable, some bifocal effect may be tolerable.

In an exemplary embodiment, a birefringent contact lens of the present invention exhibits two different indices of refraction that are usually less than about 0.2 apart. However, it will be understood that a birefringent contact lens may comprise indices of refraction any desired distance apart and fall within the scope of the present invention.

Embodiments of the present invention may be used in conjunction with any contact lens geometry or mono-focal or multi-focal refractive optical design, such as spherical, aspheric, annular, cylindrical, and/or any diffractive optical design. Moreover, contact lenses according to the present invention may be manufactured using any known or hereinafter devised technique that is suitable for creating a contact lens having the desired corrective characteristics. For example, lenses may be lathe cut, molded, or spin-cast.

In an exemplary embodiment, a system of myopia control comprises a vision correcting device, such as a spectacle or contact lens, having a birefringent material. A birefringent material of the present invention may be any material having polarizable bonds oriented primarily in one direction at the expense of the other two orthogonal directions to produce a birefringent effect. In an exemplary embodiment, the material may be a multi-layered composite.

A material's birefringent properties are primarily determined by the material's molecular constituents, wavelength, and temperature. In the visible spectral region, the ordinary indices ($n_o$) are in the range 1.5-1.57; $n_o$ decreases as the wavelength increases and increases slightly as the temperature increases, with pronounced changes near the transition temperature and with low dependence on the molecular substituents. The extraordinary index ($n_e$) has a strong dependence on the substituents, varying in the range 1:5-1.9 in the visible region of the spectrum, depending on the level of conjugation; $n_e$ decreases with increasing wavelength and declines gradually as the temperature increases, dropping sharply at the temperature range near the phase transition.

Birefringence is known in both crystalline inorganic materials and in certain organic materials having the capability of displaying similar orientation of polarizable bonds in a parallel fashion. It will be understood by one skilled in the art that birefringence may be naturally present in a material (known as "form birefringence'), or birefringence may be induced by subjecting an isotropic material to mechanical stress (stretching), by placing an isotropic material in a strong electromagnetic field, by self-assembling type techniques (these techniques are known as "induced birefringence"), or any other suitable method.

Birefringence may be induced in polymeric materials by stretching in a monotonous fashion with the draw ratio, assuming that all other parameters are kept constant. Induced birefringence also depends on many other factors, such as the temperature at drawing, drawing velocity, and conditions for annealing, among other factors.

Polymeric materials having suitably induced birefringent properties include, but are not limited to, poly(ethylene terephthalates), poly(carbonates), poly(sulfones), poly(ethersulfones), poly(styrenes), poly(estercarbonates), rigid rod polymers selected from a group comprising poly(amide), poly(ester), poly(amide-imide), poly(ester-imide) and polymers in which donor and acceptor substituents induce large molecular dipole moments and increased polarizability anisotropy.

Figure 9:
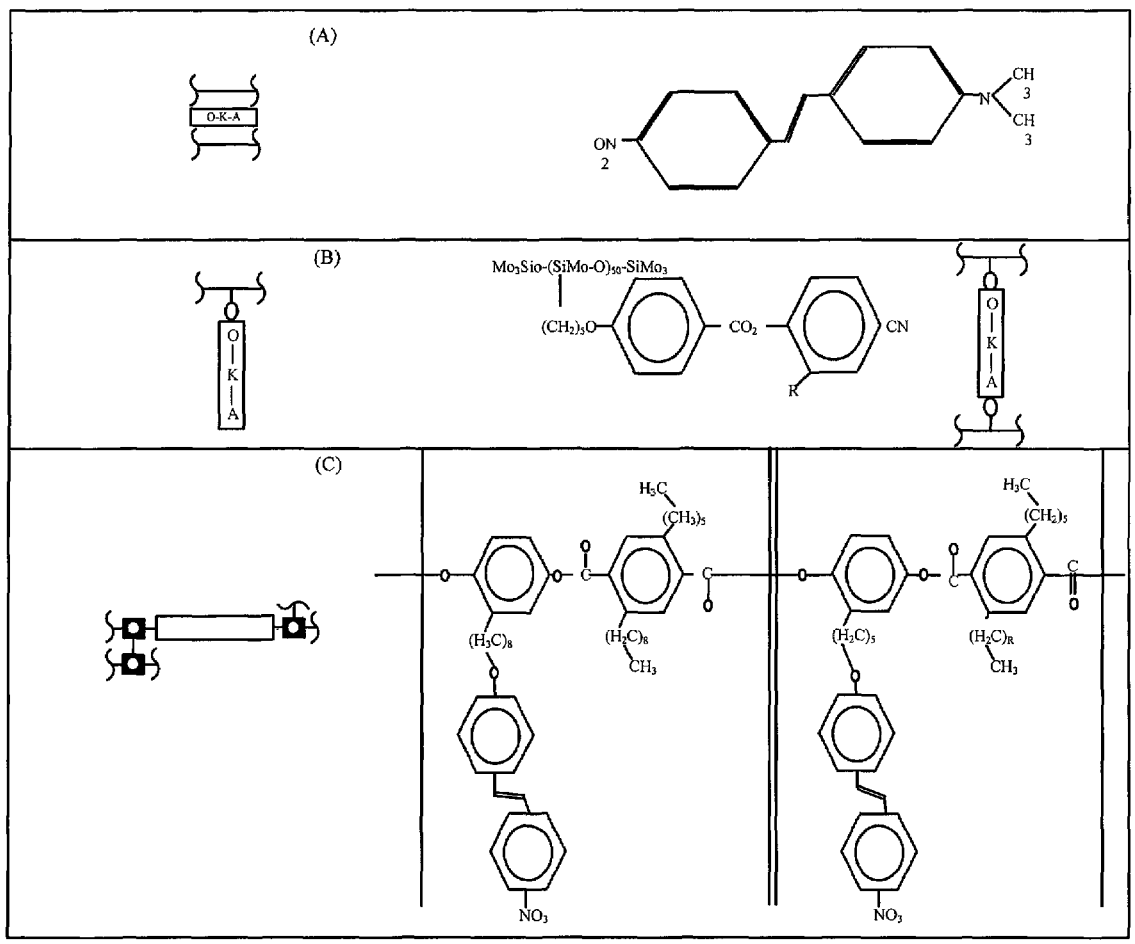
FIG. 9 illustrates chemical structures of exemplary materials of the present invention.

In accordance with an exemplary embodiment, polymers having suitably induced birefringent properties include doped (guest-host) systems, side-chain polymers, main chain polymers (including rigid rod-like polymers), and cross-linked materials. FIG. 9 provides examples of chemical structures of these systems, and examples of chromophore chemical structures.

In doped (guest-host) material systems, birefringence may be induced through the incorporation of birefringent chromophores into the polymer matrix. A variety of birefringent dopants and polymeric materials suitable for use in accordance with this exemplary embodiment are available commercially.

Figure 10:
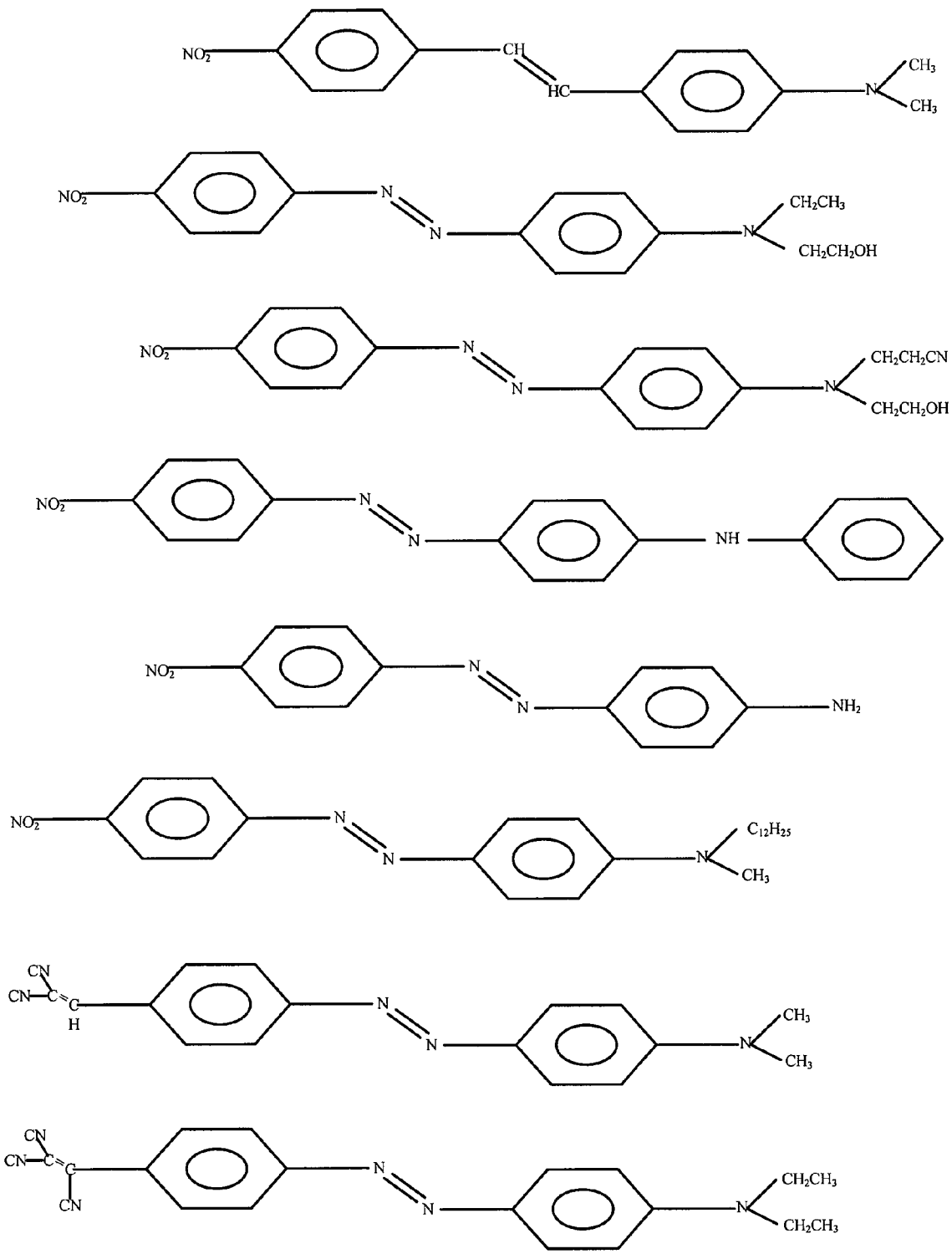
FIG. 10 illustrates chemical structures of exemplary materials of the present invention.

For example, liquid crystalline (LC) dopants, such as dimethylaminonitrostilbene (DANS), and other related structures with nitro and cyano groups as electron accepting groups, such as those depicted in FIG. 10, may been used.

Other LC-dopants may also be suitable for use in a birefringent contact lens of the present invention. For example, cyanophenyl nematic LCs dispersed in a UV-curable methacrylate polymer, produce composite materials with light transmittance greater than 80% and birefringence of 0.18-0.24 for film thickness of the order of 5µ with room temperature measurements may be used.

Moreover, composite materials with nematic LCs with birefringences in the range of 0:16-0.24 at 27:2 C in the spectral range of 400-800 nm and ferroelectric LCs are suitable materials for use in accordance with the present invention. An epoxy based system (E7, a nematic LC in an epoxy resin matrix, EP0305) showed light transmittance in the 50-80% range, with birefringence of the order of 0.2 at 35 degrees Celsius may also be used.

Birefringence properties of optical polymers can also be enhanced, for example, by doping with nanometer-size inorganic birefringent crystals or low molecular weight rod like dopants (dyes, polyenes, liquid crystals), followed by orientation. This orientation can also include Langmuir-Blodgett or self-assembling type, techniques of molecular arrangement and electromagnetic field alignments.

In side-chain polymeric materials, birefringence may be induced by attaching birefringent chromophores (such as, liquid crystalline groups, photochromic groups) to the polymeric chain. These materials offer enhanced chromophore density and thermal stability: The principal building blocks of these materials are a polymer backbone, a pendant birefringent side group, and a spacer connecting these two components.

The properties of this type of birefringent polymers can be altered by changing at least one of the three building blocks. The actual birefringence effect of the polymer depends primarily on the birefringent side group, however, the stiffness of the backbone or spacer group influences the rotational freedom of the birefringent group and consequently has an effect on the maximum achievable orientation, after, for example, application of an electromagnetic field.

Figure 11:
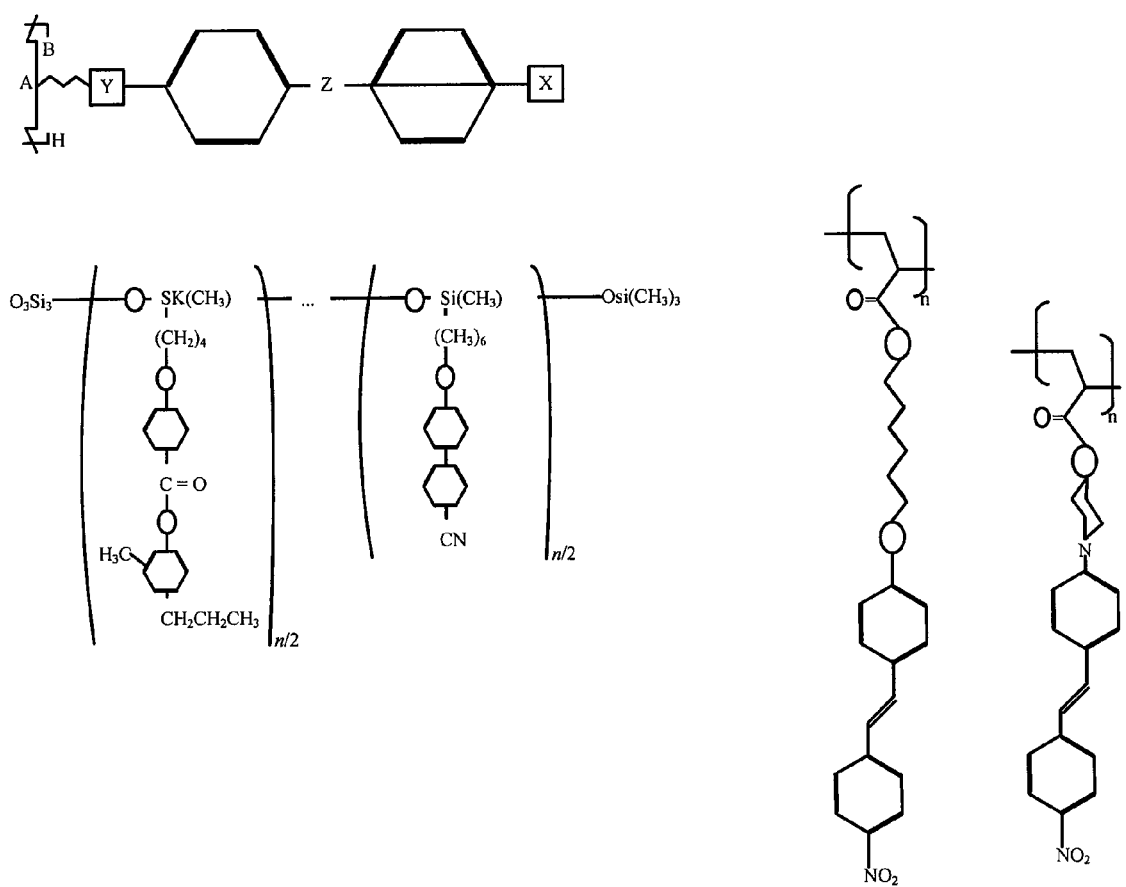
FIG. 11 illustrates chemical structures of exemplary materials of the present invention.

In side-chain polymers, such as those depicted in FIG. 11, the thermal and mechanical properties of the birefringent polymers depend on all three components. The backbone is especially important for the glass transition temperature (Tg) of the polymer: Tg values for backbones containing siloxane structures range from 7 C to 40 C, acrylates exhibit Tg of the order of 80 C, polyimides have Tg up to 400 C. The spacer and sidegroups have also an effect on Tg values; flexible, long spacers in general lower the Tg.

Optical properties depend on the specific combination of the three components: Side groups such as 4-methoxy-4'-nitrostilbene (MONS) or 4-dimethylamino-4'-nitrostilbene (DANS) tend to dominate the optical properties due to their high polarizability and optical anisotropy values. In groups with low polarizabilities/optical anisotropy, the backbone and the spacer play a major role in the optical properties. One of the major advantages of using side-chain polymers relates to their processability.

Most side-chain polymers described in the literature are intended to be used in frequency doubling applications. In such applications, the polymers are processed into thin films and 'poled' at temperatures near Tg with an electric field. After polarization of the active sites, the polymers are quenched to retain the ordered structure with birefringent behavior. The main problem with materials processed this way is their long term thermal stability. With time the molecules relax and loose their orientation due to relaxation of the groups through polymer chain motions. Materials that exhibit high Tg values and polymer crosslinking are possible solutions to enhance the stability of the birefringent properties of the materials.

Figure 12:
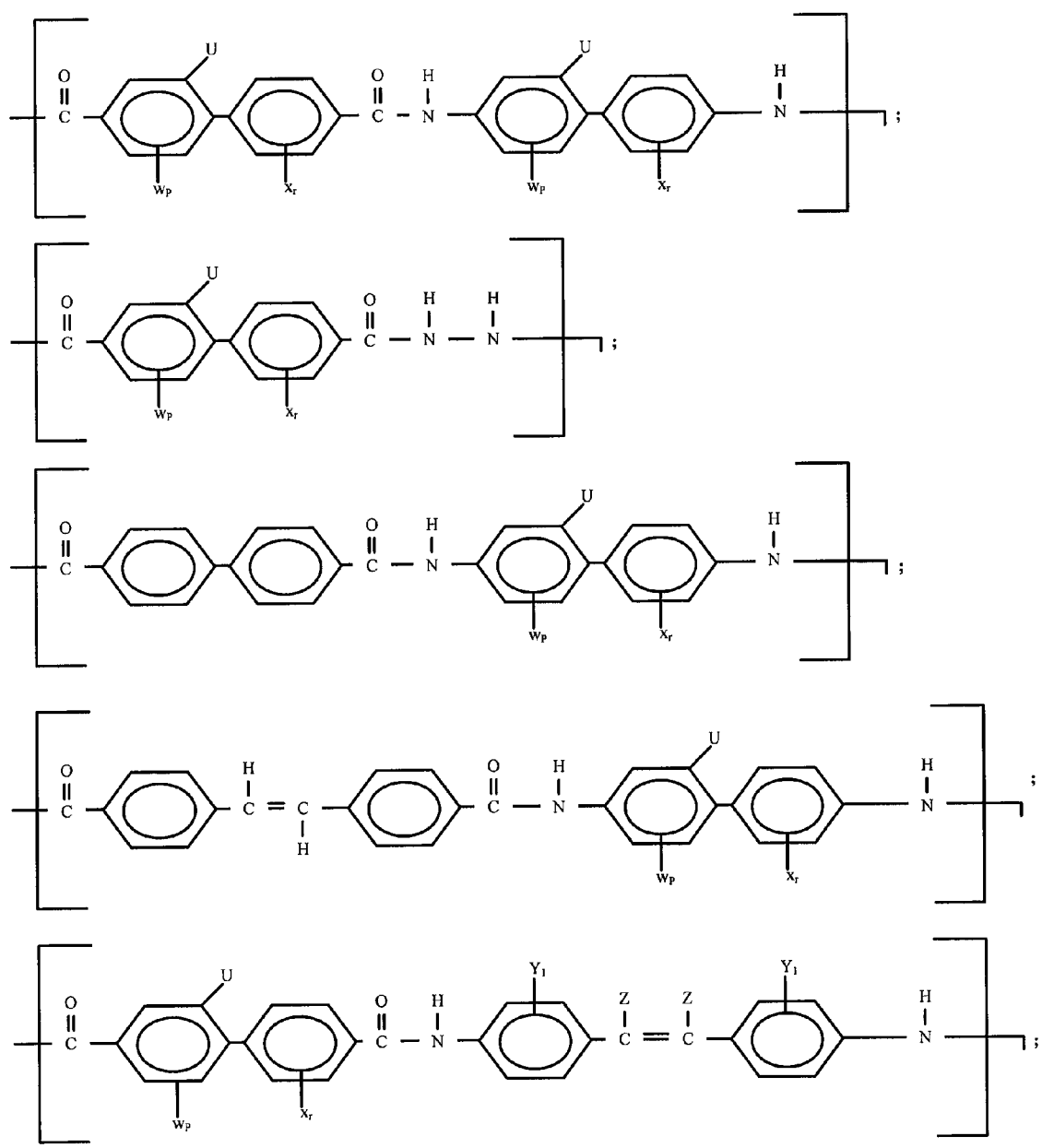
FIG. 12 illustrates chemical structures of exemplary materials of the present invention.

Main chain polymers, including rigid rod-like polymers, can be easily oriented into birefringent articles by stretching due to the asymmetrical nature of polymer chains. Examples of chemical structures of main chain polymers are provided in FIG. 12. For even greater effects, higher anisotropic chromophore densities can be achieved by incorporating chromophores into the polymer main chain. Rigid rod-like polymers, exhibiting birefringence, offer a further advantage in the time-temperature stability area.

In an embodiment, a polymeric material of the present invention may comprise a mixture of one or more of the polymeric materials listed above and one or more additional components having desirable properties, such as a material that increases oxygen transmission, enhances mechanical properties, and/or other desirable optical properties.

In accordance with another exemplary embodiment, a system of the present invention is configured to treat and/or prevent both foveal myopia and myopia caused by stimulation of the peripheral retina. For example, a contact lens of the present invention may be configured to both (1) reshape (i.e, flatten) the cornea using orthokeratology; and (2) comprise a birefringent material having polarizable bonds suitably oriented to prevent myopia caused by the peripheral retina. In such an embodiment, the polarizable bonds may be oriented parallel or substantially parallel to the central axis of the eye, or at any other suitable orientation. It will be appreciated that any system of treating both foveal myopia and myopia caused by the peripheral retina may be used in accordance with the present invention.

In an exemplary embodiment of the present invention, a method of treating and preventing the loss of visual acuity in accordance with the present invention is provided. A method of the present invention is any method of providing an optical correction device capable of causing off-axis light rays to focus in front of the peripheral retina without substantially altering the focal point of on-axis light rays.

Figure 13:
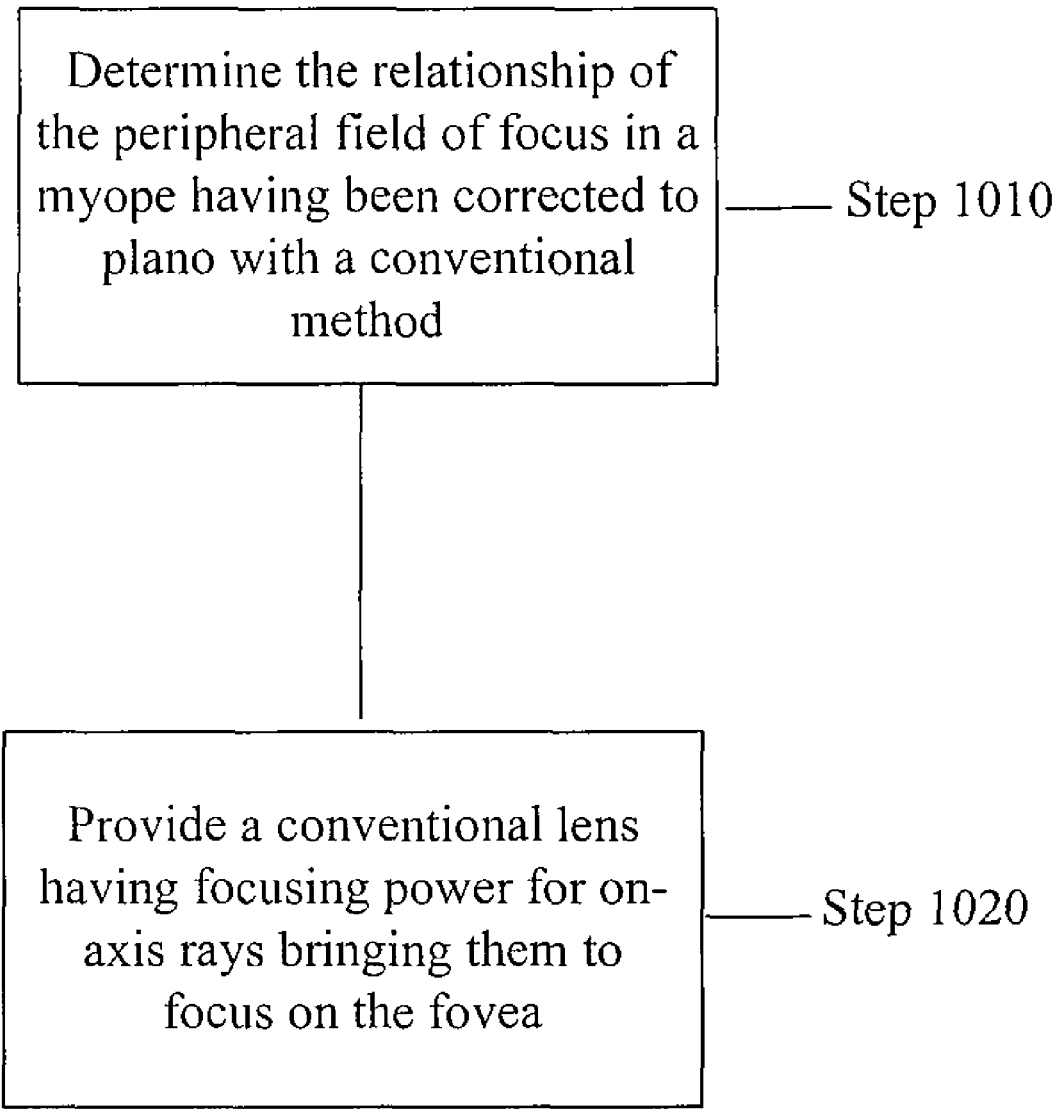
FIG. 13 illustrates an exemplary block diagram of a method of the present invention.

As shown in FIG. 13, an exemplary method of the present invention comprises Step 1010: determining the relationship of the peripheral field of focus in a myope having been corrected to plano with a conventional method; and Step 1020: providing a conventional lens having focusing power for on-axis rays bringing them to focus on the fovea.

Figure 14:
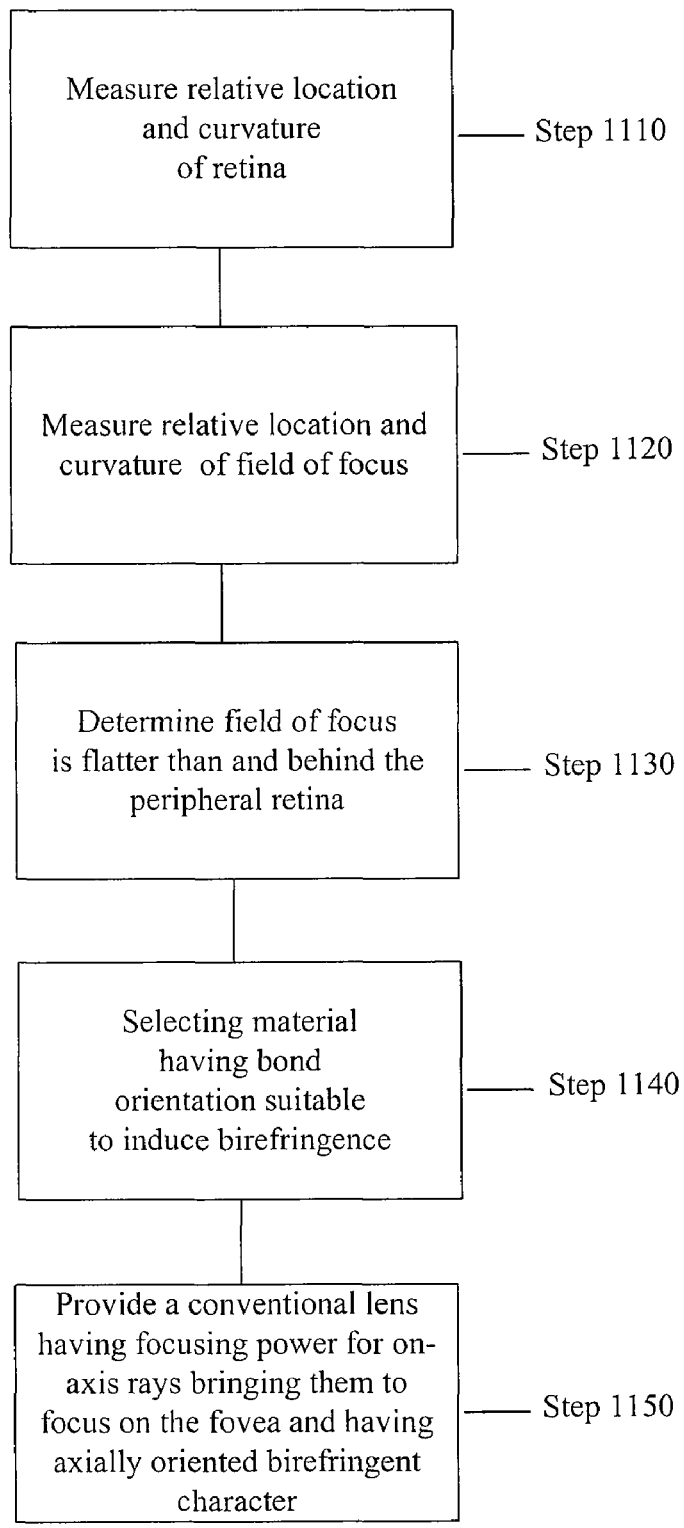
FIG. 14 illustrates an exemplary block diagram of a method of the present invention.

As shown in FIG. 14, an exemplary embodiment of a method of treating visual acuity deficiency comprises the Step 1110: measuring the relative location and curvature of a retina; Step 1120: measuring the relative location and curvature of a field of focus of light rays entering a patient's eye; Step 1130: determining if the field of focus is flatter than and behind the peripheral retina; Step 1140: selecting a material having a polymeric bond orientation suitable induce a birefringent effect such that off-axis light rays are focused in at least one of on or anterior to a peripheral retina; and Step 1150: providing a conventional lens having focusing power for on-axis rays bringing them to focus on the fovea and having axially-oriented birefringent character so as to bring a portion of the light from off-axis rays to a focal point more in front of the peripheral retina than would have been the case in the absence of the oriented birefringence. It will be understood by one skilled in the art that the curvature of the retina and field of focus may be measured using any known or hereinafter devised techniques.

Figure 15:
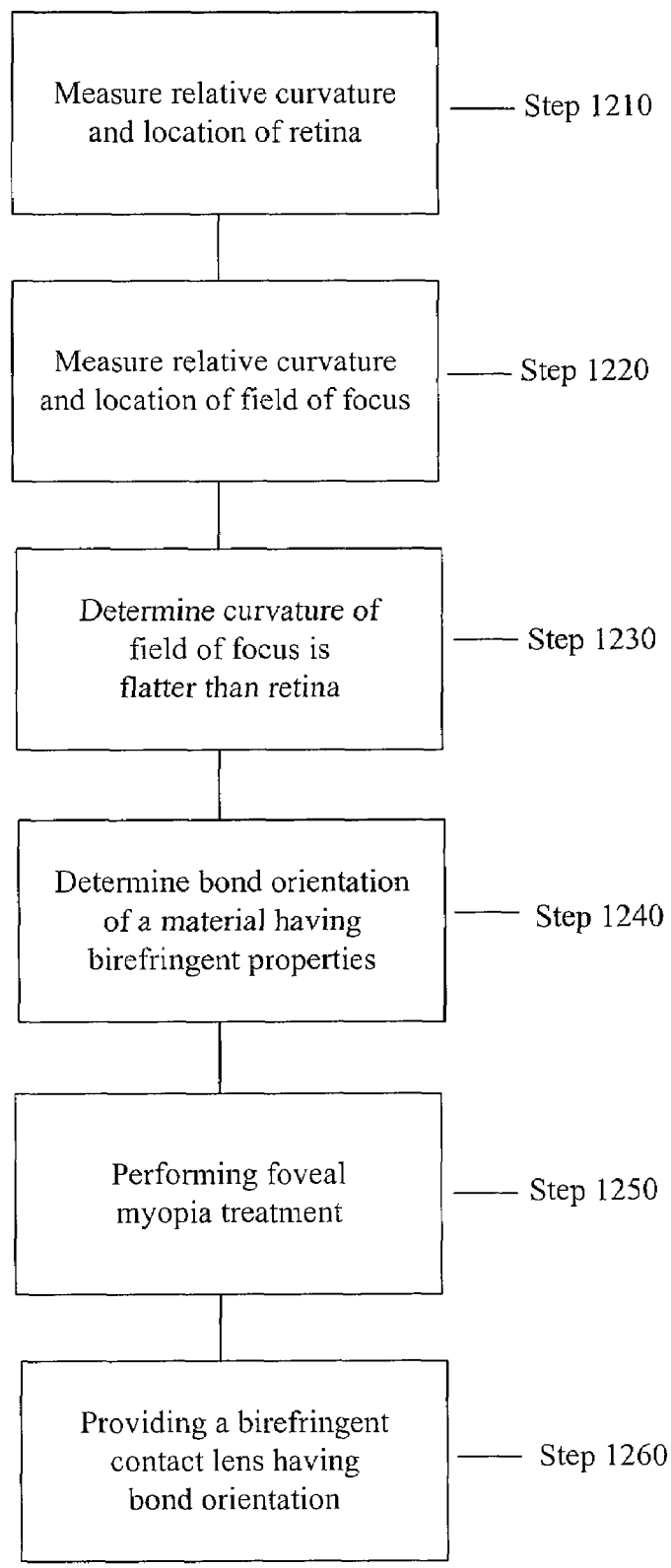
FIG. 15 illustrates an exemplary block diagram of a method of simultaneously treating foveal myopia and myopia caused by light focusing behind the peripheral retina.

In situations in which a conventional method of treating foveal myopia (such as orthokeratology, LASIK, and the like) has not yet been performed on a patient, and with reference to FIG. 15, an exemplary embodiment of the present invention comprises Step 1210: measuring the relative location and curvature of a retina of a patient; Step 1220: measuring the relative location and curvature of a patient's field of focus; Step 1230: determining the curvature of the patient's field of focus is flatter than the curvature of their retina; Step 1240: determining a polymeric bond orientation of a material having birefringent properties suitable to steepen the field of focus of light rays entering the peripheral cornea of an eye such that the light rays focus in at least one of on or anterior to the peripheral retina; Step 1250: performing foveal myopia treatment. This will likely be in the form of the birefringent properties and sufficient on-axis power to treat the foveal myopia; and Step 1260: providing a birefringent contact lens having the optimal bond orientation to the patient. Fovea myopia treatment may comprise any known or hereinafter devised technique suitable to cause light entering the eye to focus on the fovea, such as orthokeratology and corneal refractive surgery.

In accordance with another exemplary embodiment a method of the present invention may comprise making and/or providing contact lenses having both orthokeratology and birefringent capabilities.

It will be obvious to those skilled in the art to make various changes, alterations, and modifications to the invention described herein. For example, the above-referenced steps may be interchanged and/or omitted and still fall within the scope of the present invention.

We claim:

1. A vision correcting device comprising:
a polymer material suitable to induce birefringence having polarizable bonds substantially homogeneously oriented substantially parallel to a central axis of an eye which does not substantially alter the focal point of central or non-central light rays parallel to the central axis of the eye,
wherein both central and non-central light rays parallel to the central axis of the eye are focused on the fovea, and wherein the polarizable bonds steepen the angle of refraction of at least a portion of the light rays not parallel to the central axis of the eye such that at least said portion of the light rays focus in front of the peripheral retina of the eye to prevent axial elongation of the eye.

2. A vision correcting device of claim 1, wherein the polarizable bonds are oriented by stretching or drawing the material.

3. A vision correcting device of claim 1, wherein the polarizable bonds are oriented by self-assembling type techniques.

4. A vision correcting device of claim 1, wherein the polarizable bonds are oriented by electromagnetic field alignments.

5. A vision correcting device of claim 1, wherein the polymer material is selected from a group consisting of birefringent chromophore doped systems, polymers with side-chain birefringent chromophores, polymers with main-chain birefringent chromophores, and cross-linked systems thereof.

6. A vision correcting device of claim 1, wherein the polymer material is a rigid rod-like polymer.

7. A vision correcting device of claim 6, wherein the rigid rod-like polymer is one of polyethylene terephthalate, polycarbonate, polysulfonate, and polyethersulfone.

8. A vision correcting device of claim 1, comprised of a contact lens formed using one of a lathe cut, molding, and spin-cast techniques.

9. A vision correcting device of claim 1, wherein the material is a multi-layered composite.

10. A vision correcting device of claim 1, wherein the material is homogeneous.

11. A vision correcting device of claim 1, wherein the vision correcting device is a contact lens.

12. A vision correcting device of claim 1, wherein the vision correcting device is a spectacle lens.

13. A method of preventing loss of visual acuity comprising the steps of:
    measuring the relative location and curvature of a retina;
    measuring the relative location and curvature of a field of focus of light rays entering a patient's eye;
    determining if the curvature of the field of focus is flatter than and behind the curvature of a patient's retina;
    providing a contact lens having a focusing power for central and non-central on-axis rays bringing them to focus on the fovea; and
    preventing axial elongation of the patient's eye by selecting a material having a homogeneous polymeric bond orientation suitable to induce birefringence,
    wherein the homogeneous polymeric bond orientation comprises polarizable bonds homogeneously oriented at an angle of incidence relative to a central axis of the patient's eye, wherein the angle is from about 0 to about 90 degrees,
    wherein the contact lens is comprised of the material,
    wherein the homogeneous polymeric bond orientation does not substantially alter the focal point of central and non-central lights rays entering parallel to the central axis of the patient's eye, and
    wherein the homogeneous polymeric bond orientation adjusts the angle of refraction of lights rays not entering parallel to the central axis of the patient's eye such that at least a portion of lights rays not parallel to the central axis of the eye focus anterior to the peripheral retina of the eye.

14. A method of preventing loss of visual acuity as in claim 13, wherein the material is selected from a group consisting of birefringent chromophore doped systems, polymers with side-chain birefringent chromophores, polymers with main-chain birefringent chromophores, and cross-linked systems thereof.

15. A method of preventing loss of visual acuity as in claim 13, wherein the material is a rigid rod-like polymer.

16. A method of preventing loss of visual acuity as in claim 15, wherein the rigid rod-like polymer is one of polyethylene terephthalate, polycarbonate, polysulfone, and polyethersulfone.

17. A method of preventing loss of visual acuity as in claim 13, wherein the contact lens is formed using one of a lathe cut, molding, and spin-cast techniques.

* * * * *

UNITED STATES PATENT AND TRADEMARK OFFICE
CERTIFICATE OF CORRECTION

| | | |
|---|---|---|
| PATENT NO. | : 7,905,595 B2 | Page 1 of 1 |
| APPLICATION NO. | : 12/110999 | |
| DATED | : March 15, 2011 | |
| INVENTOR(S) | : William E. Meyers and Hermann Neidlinger | |

It is certified that error appears in the above-identified patent and that said Letters Patent is hereby corrected as shown below:

Title Page, Item (75) Inventors, "Hemann" should be changed to --Hermann--.

Signed and Sealed this

Seventeenth Day of May, 2011

David J. Kappos
*Director of the United States Patent and Trademark Office*